United States Patent [19]

Mack

[11] 4,068,914

[45] Jan. 17, 1978

[54] CONNECTOR DEVICE FOR TELEPHONE TERMINALS OR HOUSINGS

[76] Inventor: Jules A. Mack, 513 Second Ave., NW., Conover, N.C. 28613

[21] Appl. No.: 685,043

[22] Filed: May 10, 1976

[51] Int. Cl.² .............................................. H01R 7/28
[52] U.S. Cl. ............................ 339/143 R; 339/198 C; 339/256 SP; 174/38
[58] Field of Search ............... 339/122, 123, 176, 198, 339/194, 204, 242, 256, 258, 143; 174/38, 72 R

[56] References Cited

U.S. PATENT DOCUMENTS

| 843,890 | 2/1907 | Haff | 339/198 C |
|---|---|---|---|
| 1,014,780 | 1/1912 | Smith | 339/242 |
| 3,139,318 | 6/1964 | Binder et al. | 339/258 S |
| 3,164,668 | 1/1965 | Skubal | 174/38 |
| 3,435,124 | 3/1969 | Channell | 339/198 R |

FOREIGN PATENT DOCUMENTS

| 1,303,520 | 8/1962 | France | 339/198 E |
|---|---|---|---|
| 1,398,660 | 3/1965 | France | 339/198 E |

Primary Examiner—Joseph H. McGlynn

[57] ABSTRACT

A plurality of male tabs or "spades" protrude outwardly from spaced points around the periphery of one or more conductive body portions or blanks. The body portions are mounted, preferably in spaced relation, to the wall of a telephone terminal or housing and each of the conventional bonding harnesses within the housing is provided with a female, slip-fit type contact on the free end opposite the end which is attached onto the cable shield. Where more terminals are required than can be fabricated on the periphery of one blank, two or more blanks are superposed with the tabs of the upper blank formed to a higher angle than those of the lower blank.

5 Claims, 5 Drawing Figures

CONNECTOR DEVICE FOR TELEPHONE TERMINALS OR HOUSINGS

BACKGROUND OF THE INVENTION

It has become customary in the last several years to bury the cables of telephone systems approximately 12 to 30 inches below the earth's surface, depending on local soil conditions. At spaced points throughout the telephone system, in order to gain access to the wire or cable conductors, as for example, to provide service to customers, join lengths of wire or cable together, and permit other necessary functions, a loop of cable is brought above grade installed in a device generally referred to as a "buried plant terminal" or "buried plant housing."

In the housing the wire pairs within the cables are then made accessible for future working by removing the insulating jacket (S), metallic shields, or other wrappings surrounding the conductors. A necessary operation, when the metallic shields are stripped away from a portion of the cable length, is to reliably re-establish the electrical continuity of the shield, to provide continuous electrical protection by shielding the conductors from lightning surges which could cause dielectric failure of the conductors, and to shield the conductors from extraneous foreign voltages which may cause "noisy" circuit conditions. Electrical shield continuity at each buried plant housing or terminal is achieved by electrically interconnecting the shields on each side of the stripped area to a common point by bonding harnesses. It is in the establishment of such shield continuity that the present invention is particularly useful.

Bonding harnesses comprise mainly an electrically insulated conductor (either solid or stranded wire) attached at one end to the wire or cable shield and at the other end to a common connection point within the housing or terminal. It is important to note that the free end (the end opposite that which is attached to the shield) of each harness is attached to a common electrical bonding point to achieve interconnection of wire and cable shields. The bonding point may further be grounded in some cases.

According to existing industry standards, the common connection point or "connector" must be capable of accommodating eight bonding harness wires. One type of connector, illustrated in FIG. 2 of the drawings, includes a relatively flat plate member having a hole at one end for mounting the device to the terminal or housing wall, and a barrel member at the other end with an opening therethrough to receive the bared ends of bonding harnesses. The barrel is, in turn, provided with a tapped hole through a wall thereof which receives a slotted set screw. In practice, the bonding harness wires are grouped together and all placed within the opening in the barrel portion of the aforementioned connector. The set screw is tightened to apply sufficient mechanical pressure to achieve electrical interconnection and mechanical support for the bonding harnesses.

Such a device and method for interconnecting the cable shields within the terminal housing creates several undesirable situations. For example, in conducting routine testing or in trouble shooting, it is necessary for maintenance personnel to disconnect or electrically isolate the shield of a particular wire or cable. Isolation of a selected shield is achieved by removing the bonding harness wire associated with the selected wire or cable from the connector. However, it is easily seen that removal of one bonding harness wire from the barrel of the aforedescribed connecting device generally results in removal of other harness bonding wires. Further, where a multiplicity of wires and cables are looped through a given terminal or housing, confusion may arise as to which bonding harness wire is associated with which wire or cable. After the selected bonding harness has been removed, the remaining harnesses should be reassembled within the connecting device, so that the other, unselected harnesses will retain the shield continuity. Besides the consumption of time necessitated by the foregoing procedure, difficulty is frequently encountered in maintaining all bonding harness wires in proper position during retightening of the set screw and therefore the shield continuity may be disrupted. After the test is completed on the selected bonding harness, the set screw must again be loosened and the selected bonding harness returned into the opening, which sometimes causes further difficulty in repositioning all bonding harness wires properly for retightening of the set screw.

It has further been found that the reliability of the electrical connection is a direct function of the degree to which the set screw is tightened. While insufficient tightening of the set screw may result in undesirable loss of electrical interconnection of shields due to loosening effects from vibrations in the earth attributed to heavy roadside traffic, overtightening of the set screw may result in rupture of the bared ends, which could lead to unreliable electrical interconnection of the shield. Such loss or interruption of the shield continuity can result in derogatory effects on the performance of the cable, severe damage if struck by lightning, all of which may occasion high maintenance cost or replacement of complete sections of wire or cable between adjacent terminal or housing locations.

SUMMARY OF THE PRESENT INVENTION

The present invention, on the other hand, is directed to an improved housing construction in which a unique type of common connector provides a more reliable connection, is easier and faster to work with, and is compact and convenient.

Toward this end, a new type of common connector has been developed which includes at least two superposed fabricated blanks or members, each of which has a plurality of spaced, flat male tangs, blades, spades, or the like extending outwardly therefrom around the periphery thereof. The tangs are the male portion of a slip-fit connection. The female portion is attached to the free end of each conventional bonding harness which extends from the cable shield to the common connector. Although slip-fit connectors are not new, in and of themselves, to the inventor's knowledge they have not been used in the combination of the present invention, nor has the specific embodiment of the common connector construction itself been used at any time in other environments.

The advantages of such a connector used within a telephone buried plant housing are several. First of all, the device will permit the isolation or removal of one bonding harness for a given wire or cable without disturbing the interconnection of the other wires and cables appearing at a given terminal or housinglocation. Accordingly, shield continuity will be maintained for all cables not under test or not in use, and therefore electrical protection will be maintained for these cables while testing or maintenance procedures are conducted on other cables.

In order to disconnect a selected bonding harness from the common connector of the present invention, it is merely necessary to grasp the female terminal end with the fingers or a tool such as pliers and withdraw it from the spade or tang of the connector. Reconnection is achieved by merely pressing the female terminal back onto the tang using finger pressure. Simplicity of these procedures will result in a substantial saving of time for maintenance personnel who are performing testing and maintenance functions.

The interconnection of wire and cable shields in accordance with the present invention will result in more uniform and more reliable electrical connections within the housing. Further, problems attributable to human error in making connections previously known are substantially eliminated, since once the female terminal is pressed in place, the electrical connection is obviously achieved and assured.

Once the connection is made, it is substantially immune to vibration and other causes which tend to loosen or degrade connections according to prior techniques. Also, utilization of the slip-fit type connections provide uniformity of connection for each shield bonding harness, which is not always achieved in accordance with the practices of the prior art.

The connector according to the present invention is further adapted to be retrofitted into existing housings with substantially little or no trouble; it merely being necessary to remove the existing connecting device and replace it with the connector according to the present invention, as well as crimping a female type terminal end onto each bonding harness. Whereas in the type of connector illustrated in FIG. 2 only solid wire bonding harnesses may be used, with the connector of the present invention, stranded wire harnesses as well as solid wire harnesses can be used, and stranded wire harnesses are sometimes preferable because of resultant increased flexibility.

It is therefore an object of the present invention to provide a technique and device for improving the interconnection of cable shields within buried plant housings.

It is further an object of the present invention to provide an improved common connector for receiving multiple leads reliably where space requirements must be taken into account.

Other objects and a fuller understanding of the invention will become apparent upon reading the following detailed description of a preferred embodiment in conjunction with the accompanying drawings in which.

DETAILED DESCRIPTION OF A PREFERRED EMBODIMENT

Figure 1:
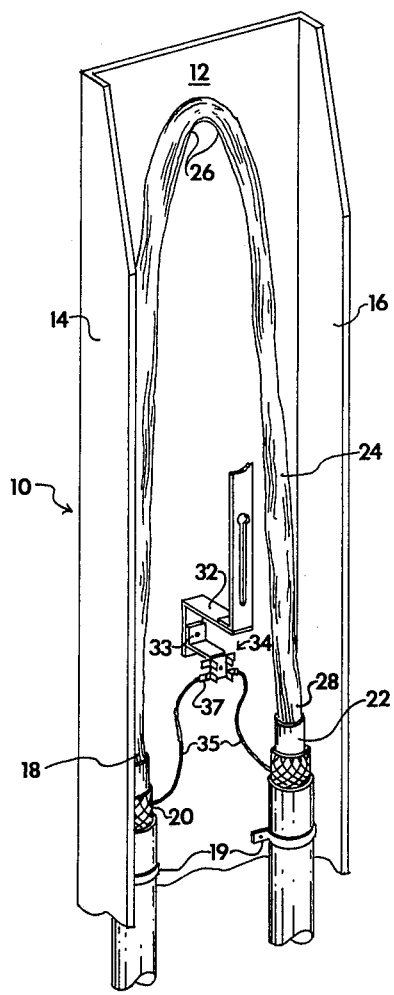
FIG. 1 is a perspective view of the upper portion of a current design of a buried plant housing illustrating the positioning therein of the common connector of the present invention.

Turning now to the drawings, and particularly to FIG. 1, there is illustrated the upper end of a buried plant housing or terminal 10, with the cover removed, and illustrating therein the device according to the present invention. In general, the invention is directed to an improved construction technique for insuring shield continuity between cable ends 18, 28 which includes a new type of connecting device 34 having a body portion 36, a means for attaching the body portion 36 to housing 10, and a plurality of male tangs or tabs 40, 42, 44, 46, 40', 42', 44', 46' which protrude outwardly from the body portion 36 of connector 34 around the periphery thereof. The bonding harnesses 35 of the improved combination include a length of wire, usually insulated, electrically attached at one end to a cable shield 20, and the other end of the wire including a female slip-fit terminal 37 of such a size and shape as to be selectively attached to a selected one of the aforementioned male tabs.

More specifically, the buried plant housing 10 is illustrated with the cover removed and shows a rear wall 12, a pair of side walls 14, 16 which together form three sides of the enclosure. Within the enclosure, a cable 18 is brought up from the ground, formed into a loop 26 and exits back out the other side of the housing at 28 to continue its path beneath the ground surface. Loop 26 is prepared for installation in the housing by removing the outer jacket at a point above cable clamps 19. The shield 20 is then removed back to a point approximately one inch above the termination of the cable jacket, and the inner wrapping 22 is removed to a point immediately above the termination of the shield 20 to leave a plurality of exposed wire conductor pairs 24 which extend up around the loop 26.

Although only one continuous cable having portions 18, 28 is illustrated, it is quite common for several cables to be brought above grade and looped through a single housing, sometimes necessitating the use of as many as eight bonding harnesses 35. A bracket 32 or similar means for attaching a ground lug such as a ground lug bolt is conventionally provided on the rear wall 12 of each housing 10, and is secured thereto by a screw assembly 33.

A spacer bracket 60 is preferably attached to screw assembly 33 through an opening 63 in a lower horizontal foot portion 61 which extends perpendicularly to an upright leg 62. An upper horizontal foot portion 64 is secured to the connector 34 and thereby spaces the connector from the rear wall 12 of the housing for easier access. Connector 34 may be used with or without a spacer bracket 60, depending on the working space available at the particular installation involved. Each of the bonding harnesses 35 are attached at one end to the shield 20 according to conventional practices, and the other end is provided with a female type slip-fit connector terminal 37 which mates with one of male tabs 40-46 or 40'-46' to complete the assembly.

Figure 2:
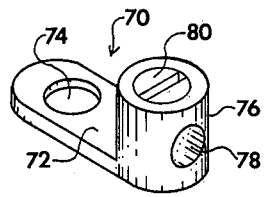
FIG. 2 is a perspective view illustrating a typical common bonding harness connector according to the prior art.

FIG. 2 is illustrative of the grounding or connecting terminals 70 according to the prior art, and include a plate portion 72 having an opening 74 therein which may be attached to the screw assembly 33 of bracket 32 also. A barrel 76 includes an opening 78 which receives the bared ends of bonding harnesses 36. A slotted head set screw 80 extends through a corresponding tapped or threaded opening in the upper portion of barrel 76, and is tightened into tight mechanical engagement with the ends of harnesses 35 to electrically connect all shields to a common point. It is this connector and similar connectors which the present invention eliminates, thereby improving the reliability and convenience of achieving shield continuity.

Figure 3:
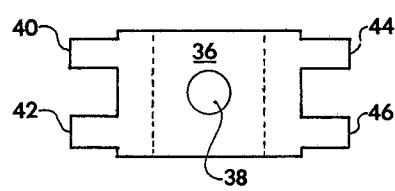
FIG. 3 is a plan view illustrating a composite common connector according to the present invention.
Figure 4:
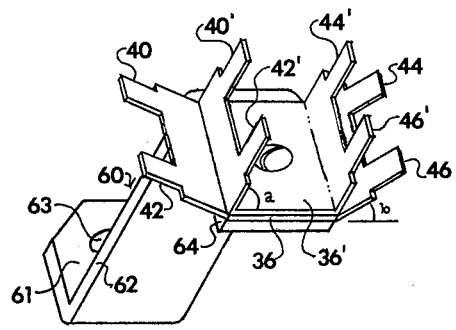
FIG. 4 is a perspective view illustrating one of the blanks which is assembled with another similar blank to form the common connector according to the present invention.

Turning now to the common connector assembly 34 itself, illustrated in FIGS. 3 and 4; where more than four connections are to be made (telephone standards require eight connections in the housings illustrated in FIG. 1), two blanks 36, 36' are initially fabricated as by a stamping operation identical to the configuration illustrated in FIG. 3. The blank or body portion 36' which is to form the upper body portion then has its tabs 40'-46' bent upwardly at a relatively steep angle a. The body portion 36 which is to form the lower member of the connector assembly 34 has its male tabs 40-46 bent upwardly, but at a lesser angle b than the tabs 40'-46' of upper assembly 36'.

In certain situations, where only one or two cable loops 26 were brought into a housing 10, it might be possible to use only one of the two blanks 36, 36'; however, telephone standards generally require the possibility of connecting at least eight harnesses. Also more than two blanks 36 may be used where additional terminals are needed.

Figure 5:
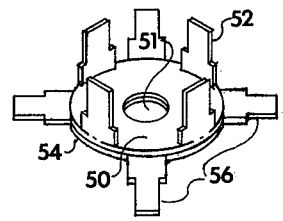
FIG. 5 is a perspective view illustrating an alternate embodiment of the common connector.

FIG. 5 is illustrative of an alternate embodiment, wherein the upper body portion is generally circular as at 50 with upstanding male tabs 52 and a central opening 51 therethrough for securing the connector. In the embodiment shown in FIG. 5, when additional terminals are required, a second or more body portions 54 are added, which are similar in shape to that of body portion 50, except the tabs 56 thereon are bent upwardly at a slightly lower angle than tabs 52. Further, tabs 56 of the lower body portion are arranged at positions spaced alternately between the tabs 52 to give further clearance between the upper and lower portions.

Although the connector of the present invention has been described as being particularly adapted for the grounding and bonding of shielded cable in buried plant housings or terminals, it should be apparent that the connector device is also useful for connecting multiple leads to a common point, especially where the shield of a cable must be interrupted to provide access to the wire pairs therein and the interrupted shield must be reconnected by bonding, grounding, or a combination of both, or in a situation at the end of a shielded cable where the shield must be grounded. Other changes and modifications may be made to the embodiment described hereinabove without departing from the scope of the invention, which is to be limited solely by the following claims.

What is claimed is:

1. A connector apparatus for connecting multiple leads to a common point comprising at least two, substantially identically formed blanks, each blank comprising a body portion and a plurality of male tabs formed integrally therewith and extending outwardly therefrom at similarly spaced points around the periphery of the body portions, said blanks in the assembled position being superposed one atop the other in electrical conductive relationship with each other and with the tabs of the upper body portion protruding outwardly from the same corresponding positions as the tabs of the lower body portion, and with the tabs of the lower body portion having a first, angular relationship with the surface of said body portion and the tabs of the upper body portion having a second, more elevated angular relationship with the surface area of said upper body portion than is the case with the tabs with the lower body portion, whereby the number of connections within a prescribed space may be maximized while permitting sufficient access room for each of said male tabs.

2. An improved buried plant housing of the type enclosing at least one buried telephone shielded cable of the type having a great number of conductor wire pairs is brought out of the ground into said housing with a length of insulation jacket and shield removed leaving said conductor wire pairs exposed to be worked, and wherein each exposed shield is connected to a connector device by a bonding harness or wire for the purpose of grounding or re-establishing shield continuity, wherein the improvement comprises:
   a. said connector device including at least one conductive body portion and means for attaching said body portion to said housing, a plurality of male tabs protruding outwardly from the periphery of said body portion at spaced positions therearound, each of said male tabs being electrically connected to the other male tabs by said conductive body member;
   b. a female, slip-fit terminal of such size and shape to be removably attached to one of said male tabs secured to the end of each body harness which is to be attached to said connector device; and
   c. said connecting device being mounted within said housing in such a position as to be spaced a sufficient distance from the rear and side walls of said housing to permit free access to workmen and repairmen without interference from said cables.

3. The improvement according to claim 2, wherein a spacer bracket receives and supports said connecting device in spaced relation to the walls of said housing, said spacer bracket having a length greater than the diameter of said cable.

4. The improvement according to claim 2 wherein said connecting device includes a pair of said body portions assembled together in superposed relation, one above the other, the male tabs of the upper of said body portions being bent upwardly from said body portion at an angle greater than the angle at which the corresponding male tabs of the lower body portions are bent.

5. The improvement according to claim 4 wherein said body portions are formed in a slightly arcuate configuration, whereby when superposed and fastened to the housing, a superior connection between the body portions will be effected.

* * * * *